US008712401B2

(12) United States Patent
Yoo et al.

(10) Patent No.: US 8,712,401 B2
(45) Date of Patent: Apr. 29, 2014

(54) RADIO LINK MONITORING (RLM) AND REFERENCE SIGNAL RECEIVED POWER (RSRP) MEASUREMENT FOR HETEROGENEOUS NETWORKS

(75) Inventors: Taesang Yoo, San Diego, CA (US); Tao Luo, San Diego, CA (US); Xiliang Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 159 days.

(21) Appl. No.: 13/084,806

(22) Filed: Apr. 12, 2011

(65) Prior Publication Data

US 2011/0256861 A1 Oct. 20, 2011

Related U.S. Application Data

(60) Provisional application No. 61/325,100, filed on Apr. 16, 2010.

(51) Int. Cl.
*H04W 24/00* (2009.01)
*H04W 72/04* (2009.01)

(52) U.S. Cl.
CPC ............. *H04W 24/00* (2013.01); *H04W 72/04* (2013.01)
USPC .......................................... 455/423; 370/242

(58) Field of Classification Search
CPC ............................ H04W 24/00; H04W 72/04
USPC .......................................... 455/423; 370/252
See application file for complete search history.

(56) References Cited

U.S. PATENT DOCUMENTS

2010/0322100 A1* 12/2010 Wan et al. ................... 370/252

FOREIGN PATENT DOCUMENTS

| WO | 2009010226 A1 | 1/2009 |
| WO | 2009102264 A2 | 8/2009 |
| WO | 2010033957 A2 | 3/2010 |

OTHER PUBLICATIONS

International Search Report and Written Opinion—PCT/US2011/032732—ISA/EPO—Sep. 22, 2011.
Nokia: "Radio link monitoring in DRX", 3GPP Draft; R4-090504, 3rd Generation Partnership Project (3GPP), Mobile Competence Centre ; 650, Route Deslucioles ; F-06921 Sophia-Antipolis Cedex; France, No. Athens, Greece; Feb. 5, 2009, XP050326964, [retrieved on Feb. 5, 2009].
NTT Docomo: "Way forward on RLM Testing", 3GPP Draft; R4-090416, 3rd Generation Partnership Project (3GPP), Mobile Competence Centre ; 650, Route Deslucioles ; F-06921 Sophia-Antipolis Cedex; France, No. Ljubljana; Jan. 22, 2009, XP050326875, [retrieved on Jan. 22, 2009].
Partial International Search Report—PCT/US2011/032732—ISA/EPO—Jul. 20, 2011.

(Continued)

*Primary Examiner* — Charles Shedrick
(74) *Attorney, Agent, or Firm* — Tyler J. Overall

(57) ABSTRACT

A method for communicating in an advanced long term evolution (LTE-A) network using common reference signal (CRS) resources associated with different interference levels due to resource partitioning is disclosed. Signals are received from an eNodeB indicating a subset of CRS resources for radio link monitoring (RLM) and/or reference signal received power (RSRP) measuring. The subset of CRS resources includes the CRS resources expected to have lower interference from the interfering eNodeBs. RLM and/or RSRP measurements are performed based on the indicated subset.

8 Claims, 6 Drawing Sheets

(56) References Cited

OTHER PUBLICATIONS

Qualcomm Europe: "Carrier Aggregation in Heterogeneous Networks", 3GPP Draft; R1-092062, 3rd Generation Partnership Project (3GPP), Mobile Competence Centre ; 650, Route Des Lucioles ; F-06921 Sophia-Antipolis Cedex ; France, No. San Francisco, USA; Apr. 28, 2009, XP050339520, [retrieved on Apr. 28, 2009].
Taiwan Search Report—TW100113409—TIPO—May 21, 2013.

* cited by examiner

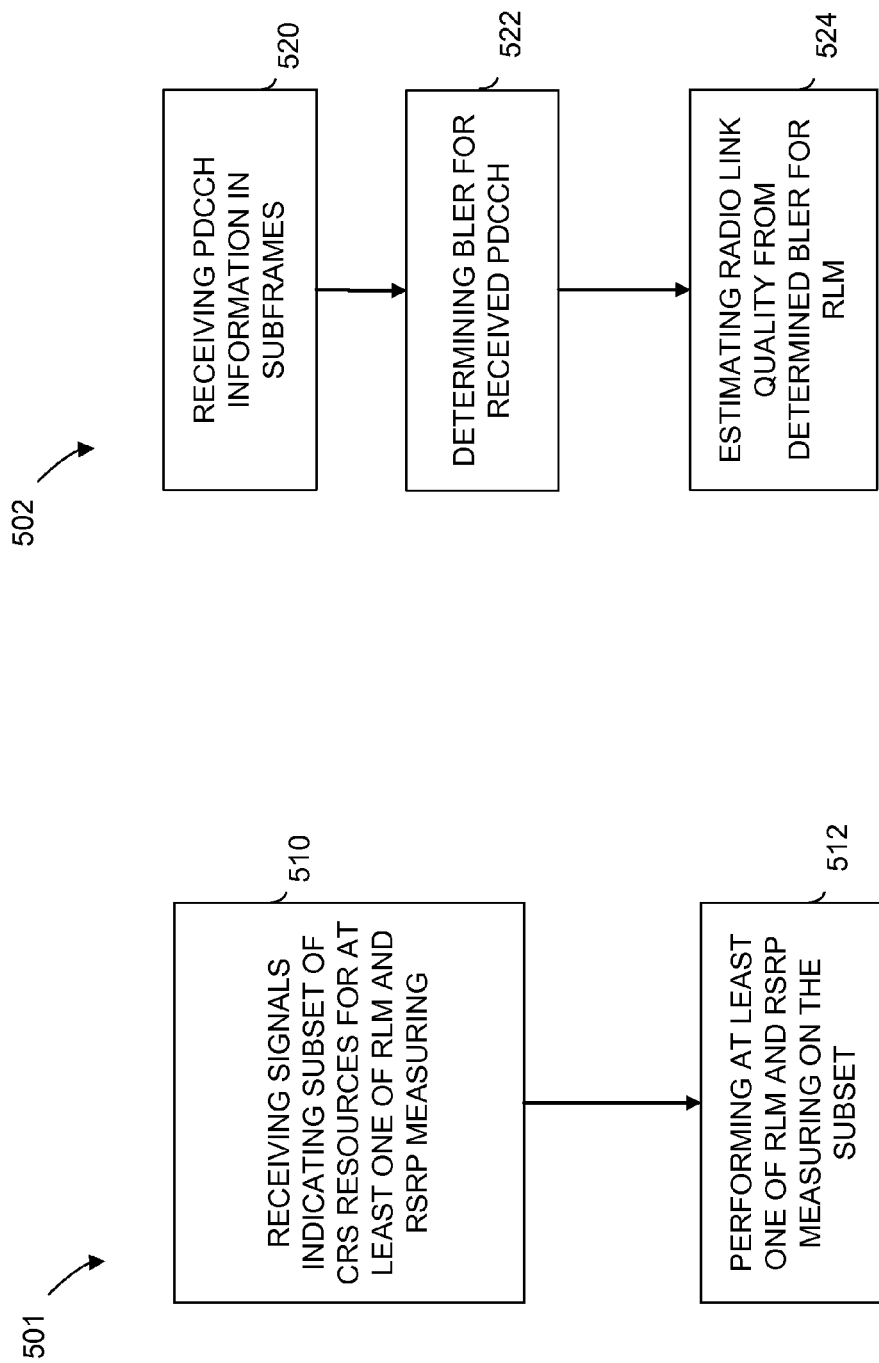

RADIO LINK MONITORING (RLM) AND REFERENCE SIGNAL RECEIVED POWER (RSRP) MEASUREMENT FOR HETEROGENEOUS NETWORKS

CROSS-REFERENCE TO RELATED APPLICATION

This application claims the benefit under 35 U.S.C. §119(e) to U.S. Provisional Patent Application No. 61/325,100 entitled RADIO LINK MONITORING (RLM) AND REFERENCE SIGNAL RECEIVED POWER (RSRP) MEASUREMENT FOR HETEROGENEOUS NETWORKS, filed on Apr. 16, 2010, the disclosure of which is expressly incorporated by reference herein in its entirety.

BACKGROUND

1. Field

Aspects of the present disclosure relate generally to wireless communication systems, and more particularly to the determination of radio link failure in systems using enhanced interference coordination and cancellation.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect, a method for communicating in an advanced long term evolution (LTE-A) network using common reference signal (CRS) resources associated with different interference levels due to resource partitioning is disclosed. Signals are received from an eNodeB indicating a subset of CRS resources for radio link monitoring (RLM) and/or reference signal received power (RSRP) measuring. The subset of CRS resources includes the CRS resources expected to have lower interference from the interfering eNodeBs. RLM and/or RSRP measurements are performed based on the indicated subset.

In another aspect, a method for communicating in an advanced long term evolution (LTE-A) network is disclosed. Physical downlink control channel (PDCCH) information is received in subframes of the LTE-A network. A block error rate (BLER) for the received PDCCH determined and a radio link quality is estimated from the determined BLER, for radio link monitoring (RLM).

Another aspect discloses an apparatus including means for receiving signals from an eNodeB indicating a subset of CRS resources for radio link monitoring (RLM) and/or reference signal received power (RSRP) measuring. The subset of CRS resources includes the CRS resources expected to have lower interference from interfering eNodeBs. A means for performing RLM and/or RSRP measuring based on the indicated subset is also included.

In another aspect an apparatus including a means for receiving physical downlink control channel (PDCCH) information in subframes of a LTE-A network is included. A means for determining a block error rate (BLER) for the received PDCCH and a means for estimating a radio link quality, from the determined BLER, for radio link monitoring (RLM) are also included.

In another aspect, a computer program product for wireless communications in a wireless network is disclosed. The computer readable medium has program code recorded thereon which, when executed by one or more processors, cause the one or more processors to perform operations of receiving signals from an eNodeB indicating a subset of CRS resources for at least one of radio link monitoring (RLM) and reference signal received power (RSRP) measuring. The subset of CRS resources includes the CRS resources expected to have lower interference from interfering eNodeB. The program code also causes the one or more processors to perform RLM and/or RSRP measuring based on the indicated subset.

Another aspect discloses a computer program product for wireless communications in a wireless network. The computer readable medium has program code recorded thereon which, when executed by one or more processors, cause the one or more processors to perform operations of receiving physical downlink control channel (PDCCH) information in subframes of a LTE-A network and determining a block error rate (BLER) for the received PDCCH. The program code also causes the one or more processor to estimate radio link quality from the determined BLER, for radio link monitoring (RLM).

Another aspect discloses an aspect for wireless communication having a memory and at least one processor coupled to the memory. The processor(s) is configured to receive signals from an eNodeB indicating a subset of CRS resources for at least one of radio link monitoring (RLM) and reference signal received power (RSRP) measuring. The subset of CRS resources includes the CRS resources expected to have lower interference from interfering eNodeB. The processor is also configured to perform RLM and/or RSRP measuring based on the indicated subset.

In another aspect, an apparatus for wireless communication having a memory and at least one processor coupled to the memory is disclosed. The processor(s) is configured to receive physical downlink control channel (PDCCH) information in subframes of a LTE-A network. The processor is also configured to determine a block error rate (BLER) for the received PDCCH and to estimate radio link quality from the determined BLER, for radio link monitoring (RLM).

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIGS. 6A-6B are block diagrams illustrating a method for determining radio link failure in a wireless communications system.

DETAILED DESCRIPTION

Figure 1:
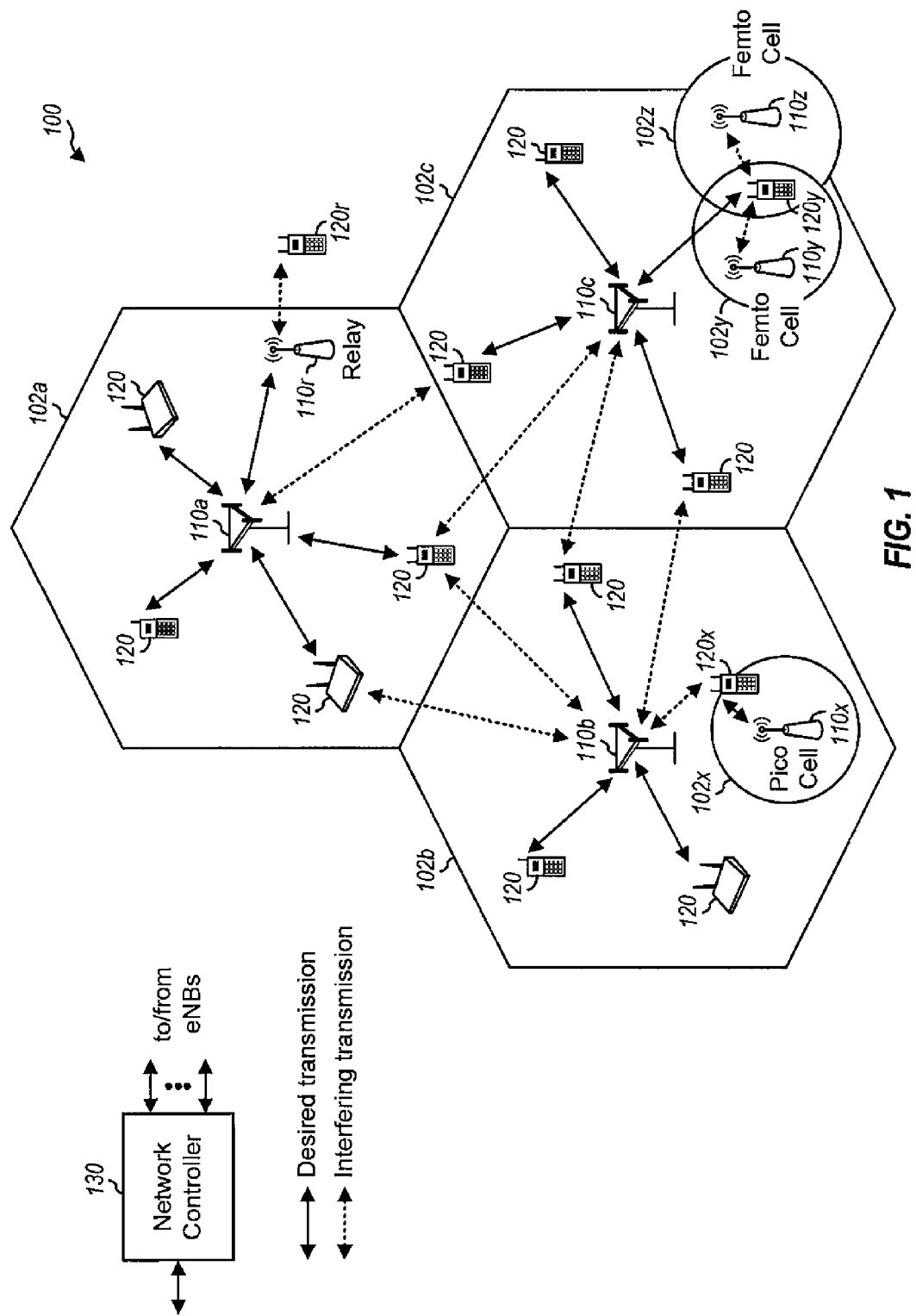
FIG. 1 is a block diagram conceptually illustrating an example of a telecommunications system.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

FIG. 1 shows a wireless communication network 100, which may be an LTE-A network. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. And, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 supports synchronous operation, where the eNodeBs may have similar frame timing, and transmissions from different eNodeBs may be approximately aligned in time. In one aspect, the wireless network 100 may support Frequency Division Duplex (FDD) or Time Division Duplex (TDD) modes of operation. The techniques described herein may be used for either FDD or TDD mode of operation.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, a tablet or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.25, 2.5, 5, 10 or 20 MHz, respectively.

Figure 2:
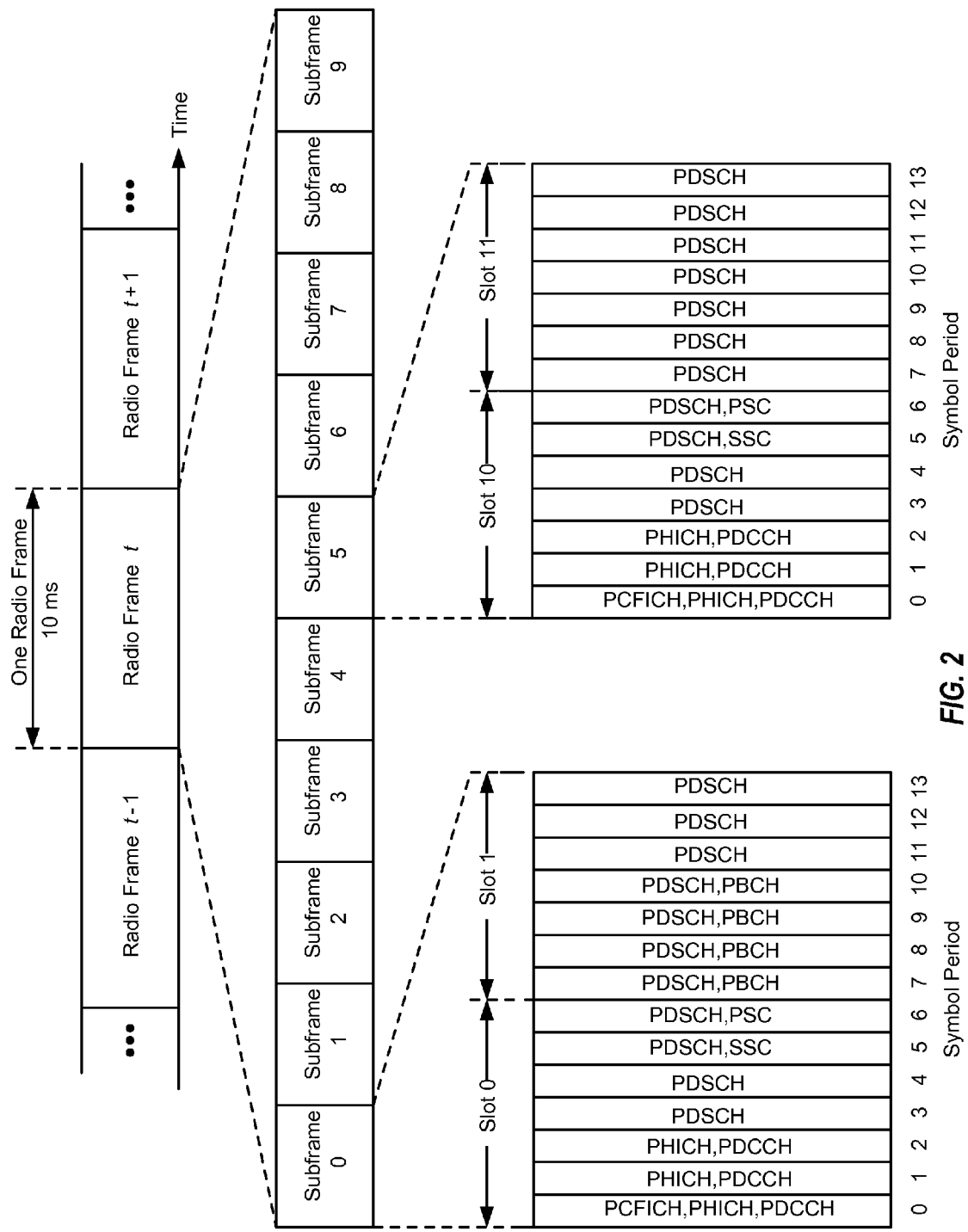
FIG. 2 is a diagram conceptually illustrating an example of a downlink frame structure in a telecommunications system.

FIG. 2 shows a downlink FDD frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSS, SSS and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period $0$. The PHICH may occupy three REGs, which may be spread across frequency, in one or more configurable symbol periods. For example, the three REGs for the PHICH may all belong in symbol period $0$ or may be spread in symbol periods $0$, $1$ and $2$. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
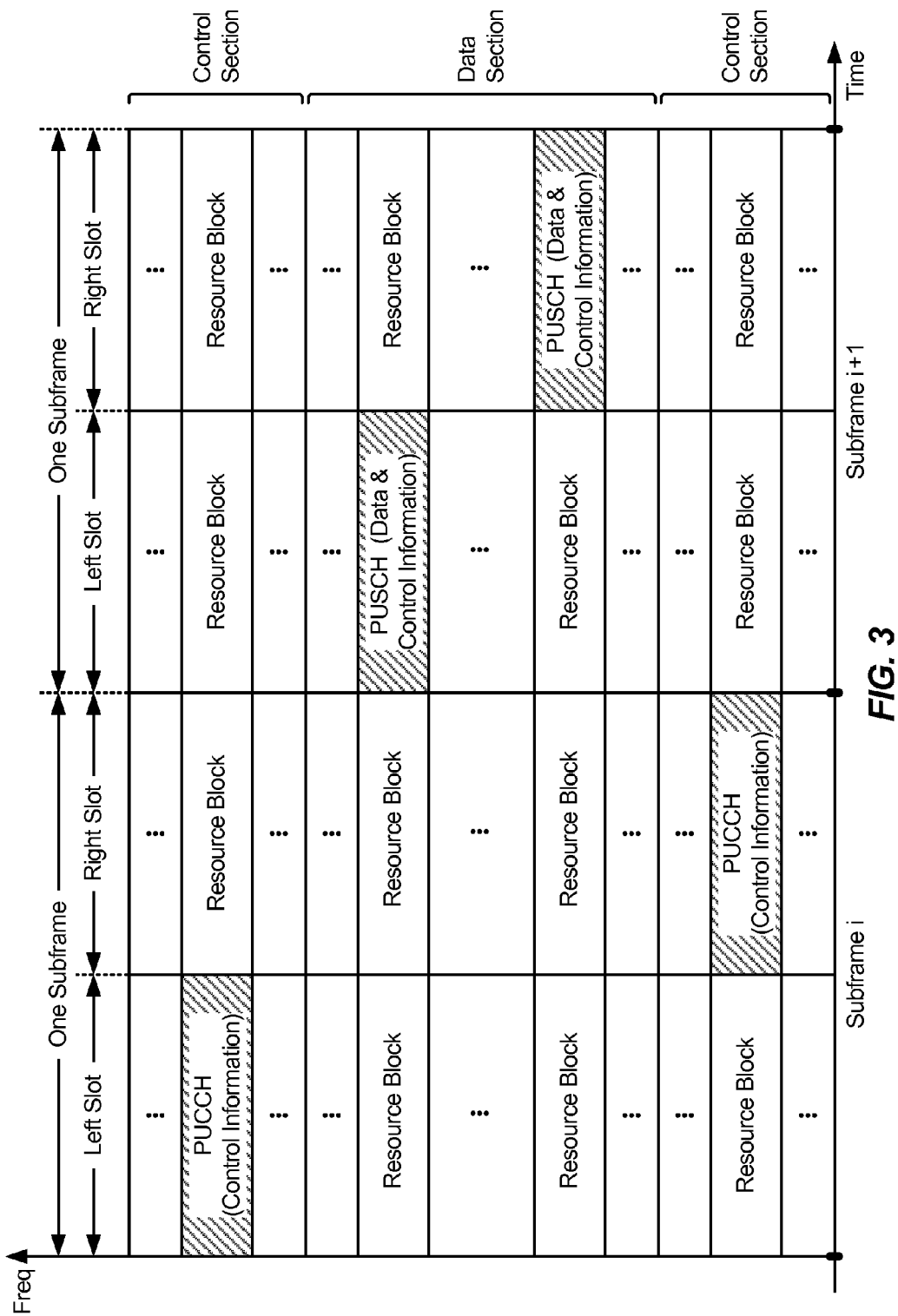
FIG. 3 is a block diagram conceptually illustrating an example frame structure in uplink communications.

FIG. 3 is a block diagram conceptually illustrating an exemplary FDD and TDD (non-special subframe only) subframe structure in uplink long term evolution (LTE) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNodeB. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the UL resources. For example, a control and a data channel, parallel control channels, and parallel data channels may be transmitted by a UE.

The PSS, SSS, CRS, PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Figure 4:
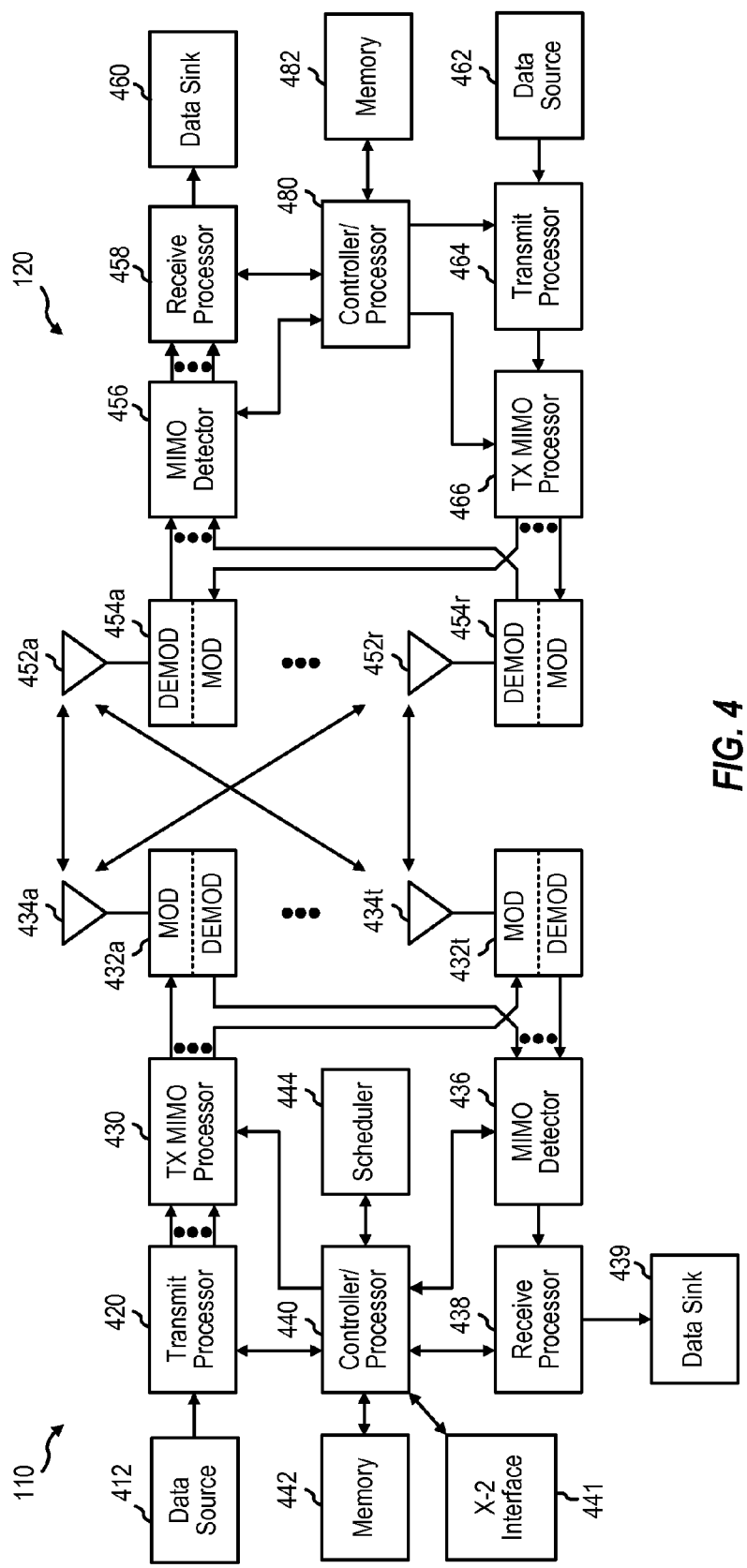
FIG. 4 is a block diagram conceptually illustrating a design of a base station/eNodeB and a UE configured according to one aspect of the present disclosure.

FIG. 4 shows a block diagram of a design of a base station/eNodeB 110 and a UE 120, which may be one of the base stations/eNodeBs and one of the UEs in FIG. 1. The base station 110 may be the macro eNodeB 110*c* in FIG. 1, and the UE 120 may be the UE 120*y*. The base station 110 may also be a base station of some other type. The base station 110 may be equipped with antennas 434*a* through 434*t*, and the UE 120 may be equipped with antennas 452*a* through 452*r*.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 120, the antennas 452*a* through 452*r* may receive the downlink signals from the base station 110 and may provide received signals to the demodulators (DEMODs) 454*a* through 454*r*, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the modulators 454*a* through 454*r* (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440. The base station 110 can send messages to other base stations, for example, over an X2 interface 441.

The controllers/processors 440 and 480 may direct the operation at the base station 110 and the UE 120, respectively. The processor 440 and/or other processors and modules at the base station 110 may perform or direct the execution of various processes for the techniques described herein. The processor 480 and/or other processors and modules at the UE 120 may also perform or direct the execution of the functional blocks illustrated in use FIGS. 5A-5B, and/or other processes for the techniques described herein. The memories 442 and 482 may store data and program codes for the base station 110 and the UE 120, respectively. A scheduler 444 may schedule UEs for data transmission on the downlink and/or uplink.

Figure 5:
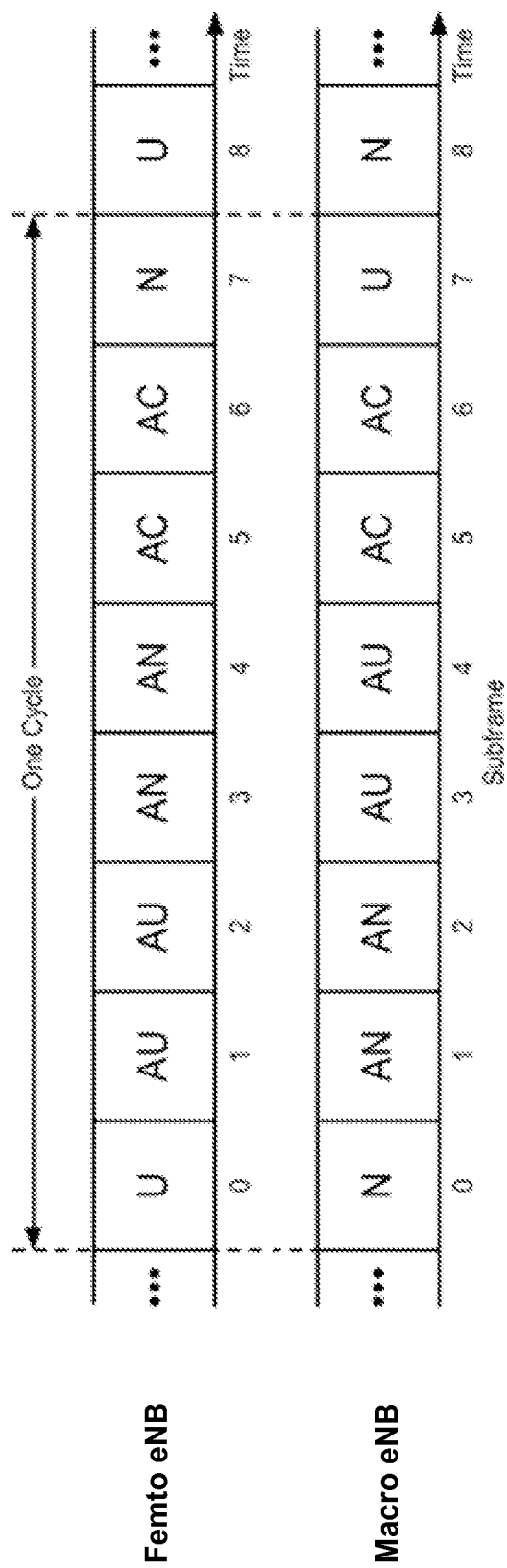
FIG. 5 is a block diagram conceptually illustrating adaptive resource partitioning in a heterogeneous network according to one aspect of the disclosure.

FIG. 5 is a block diagram illustrating TDM partitioning in a heterogeneous network according to one aspect of the disclosure. A first row of blocks illustrate sub frame assignments for a femto eNodeB, and a second row of blocks illustrate sub frame assignments for a macro eNodeB. Each of the eNodeBs has a static protected sub frame during which the other eNodeB has a static prohibited sub frame. For example, the femto eNodeB has a protected sub frame (U sub frame) in sub frame 0 corresponding to a prohibited sub frame (N sub frame) in sub frame 0. Likewise, the macro eNodeB has a protected sub frame (U sub frame) in sub frame 7 corresponding to a prohibited sub frame (N sub frame) in sub frame 7. Sub frames 1-6 are dynamically assigned as either protected sub frames (AU), prohibited sub frames (AN), and common sub frames (AC). During the dynamically assigned common sub frames (AC) in sub frames 5 and 6, both the femto eNodeB and the macro eNodeB may transmit data.

Protected sub frames (such as U/AU sub frames) have reduced interference and a high channel quality because aggressor eNodeBs are prohibited from transmitting. Prohibited sub frames (such as N/AN sub frames) have no data transmission to allow victim eNodeBs to transmit data with low interference levels. Common sub frames (such as C/AC sub frames) have a channel quality dependent on the number of neighbor eNodeBs transmitting data. For example, if neighbor eNodeBs are transmitting data on the common sub frames, the channel quality of the common sub frames may be lower than the protected sub frames. Channel quality on common sub frames may also be lower for extended boundary area (EBA) UEs strongly affected by aggressor eNodeBs. An EBA UE may belong to a first eNodeB but also be located in the coverage area of a second eNodeB. For example, a UE communicating with a macro eNodeB that is near the range limit of a femto eNodeB coverage is an EBA UE.

Another example interference management scheme that may be employed in LTE/-A is the slowly-adaptive interference management. Using this approach to interference management, resources are negotiated and allocated over time scales that are much larger than the scheduling intervals. The goal of the scheme is to find a combination of transmit powers for all of the transmitting eNodeBs and UEs over all of the time or frequency resources that maximizes the total utility of the network. "Utility" may be defined as a function of user data rates, delays of quality of service (QoS) flows, and fairness metrics. Such an algorithm can be computed by a central entity that has access to all of the information used for solving the optimization and has control over all of the transmitting entities, such as, for example, the network controller 130 (FIG. 1). This central entity may not always be practical or even desirable. Therefore, in alternative aspects a distributed algorithm may be used that makes resource usage decisions based on the channel information from a certain set of nodes. Thus, the slowly-adaptive interference algorithm may be deployed either using a central entity or by distributing the algorithm over various sets of nodes/entities in the network.

A UE may operate in a dominant interference scenario in which the UE may observe high interference from one or more interfering eNodeBs. A dominant interference scenario may occur due to restricted association. For example, in FIG. 1, the UE 120y may be close to the femto eNodeB 110y and may have high received power for the eNodeB 110y. However, the UE 120y may not be able to access the femto eNodeB 110y due to restricted association and may instead connect to the macro eNodeB 110c with lower received power (as shown in FIG. 1) or to the femto eNodeB 110z also with lower received power (not shown in FIG. 1). The UE 120y may then observe high interference from the femto eNodeB 110y on the downlink and may also cause high interference to the eNodeB 110y on the uplink.

When operating in the connected mode, the UE 120y may experience so much interference in this dominant interference scenario that it may no longer be able to maintain a acceptable connection with the eNodeB 110c, for example. The analysis of interference by the UE 120y includes obtaining the signal quality, such as by calculating the error rate of the PDCCH received on the downlink from the eNodeB 110c. Alternatively, the error rate of the PDCCH may be predicted based on the signal-to-noise ratio (SNR) of the PDCCH. If the error rate of the PDCCH, as calculated by the UE 120y, reaches a predefined level, the UE 120y will declare a radio link failure (RLF) to the eNodeB 110c and end the connection. At this point, the UE 120y may attempt to reconnect to the eNodeB 110c or possibly attempt to connect to another eNodeB with a stronger signal.

A dominant interference scenario may also occur due to range extension. Range extension occurs when a UE connects to an eNodeB with lower path loss and lower SNR (signal to noise ratio) among all eNodeBs detected by the UE. For example, in FIG. 1, the UE 120x may detect the macro eNodeB 110b and the pico eNodeB 110x. Further, the UE may have lower received power for the eNodeB 110x than the eNodeB 110b. The UE 120x may connect to the pico eNodeB 110x if the path loss for the eNodeB 110x is lower than the path loss for the macro eNodeB 110b. This may result in less interference to the wireless network for a given data rate for the UE 120x.

In a range extension enabled wireless network, enhanced inter-cell interference coordination (eICIC) may enable the UEs to obtain service from a lower power base station (e.g., a pico base station, femto base station, relay, etc.) in the presence of a macro base station with strong downlink signal strength, and to enable the UEs to obtain service from a macro base station in the presence of a strongly interfering signal from a base station to which the UE is not authorized to connect. The eICIC may be used to coordinate resources such that the interfering base station may relinquish some resources and enable control and data transmissions between the UE and the serving base station. When a network supports eICIC, the base stations negotiate and coordinate the use of resources to reduce and/or eliminate interference from the interfering cell relinquishing part of its resources. Accordingly, a UE can access the serving cell even with severe interference by using the resources yielded by the interfering cell.

For example, a coverage lapse within a macro cell may exist when a femto cell with a closed access mode, in which only member femto UEs may access the cell, lies within the coverage area of the macro cell. By making this femto cell give up some of its resources, the UE within the femto cell coverage area may access its serving macro cell by using the resources yielded by the femto cell. In a radio access system using OFDM such as E-UTRAN, these yielded resources may be time-based, frequency-based, or a combination of both. When the yielded resources are time-based, the interfering cell refrains from using some of its accessible subframes in the time domain. When these resources are frequency-based, the interfering cell does not use some of its accessible subcarriers in the frequency domain. When the yielded resources are a combination of both frequency and time, the interfering cell does not use the resources defined by frequency and time.

For a UE that supports eICIC, the existing criteria for analyzing radio link failure conditions may not satisfactorily address the conditions of the coordinating cells. Generally, when the UE declares radio link failure, the UE discontinues communication with the base station and searches for a new base station. When the UE lies in a region with severe interference, where the interference is coordinated between base stations by the interfering cell giving up part of its resources, the UE measurement of the signal to noise ratio (SNR) or the decoding error rate of PDCCH may vary considerably, depending on whether the measured resources were yielded by the interfering cell. When the UE measures the SNR or the decoding error rate of the PDCCH for the resources which were not yielded by the interfering cell, the UE can erroneously declare an RLF due to high interference, although the UE can still access the serving cell using resources yielded by the interfering cell.

In an LTE-A network, the existence of heterogeneous cells may corrupt some CRS (common reference signals) symbols and/or tones, making some CRS symbols and/or tones less reliable than others. For example, in a heterogeneous network having co-channel deployment of femto and pico cells, the CRS (common reference signal) on the control and data regions may experience different interference. Additionally, CRSs on the PBCH (physical broadcast channel) region may experience different interference than CRS on other regions. Further, if cells are misaligned, then timing offset among the cells may non-uniformly affect different CRS symbols and/or tones. Additionally, a timing offset that exists between the backhaul and access links of a relay may non-uniformly affect different CRS symbols. Further, the possibility of corrupt symbols and/or tones may affect radio link monitoring (RLM) and reference signal received power (RSRP) measurements.

One aspect of the present disclosure is directed to using a subset of CRS tones and/or symbols in one or more selected subframes for radio link monitoring and reference signal received power (RSRP) measurements. Another aspect is directed to monitoring PDCCH (physical downlink control channel) block error rate.

With respect to radio link monitoring (RLM) or reference signal received power (RSRP) measurements, the UE may receive signals from an eNodeB (eNB) of the LTE-A network indicating a subset of common reference signal (CRS) symbols and/or CRS tones of a CRS symbol. The CRS tones and/or symbols may be used during radio link monitoring (RLM) and/or reference signal received power (RSRP) measuring. The subset of CRS tones and/or CRS symbols is a group of CRS tones and/or CRS symbols selected from all of the CRS tones and/or CRS symbols available from the eNodeB of the LTE-A network. The CRS tones and/or CRS symbols selected by the eNodeB and signaled to the UE are expected to have lower interference from other eNodeBs in the LTE-A network, for example because of resource partitioning (frequency or time (e.g., as seen in FIG. 5)).

In one aspect, the eNodeB signals subframes having CRS tones to be used for radio link monitoring (RLM) and RSRP measurements. In one example, these CRS tones may be used when the serving cell and the interfering cell negotiate and coordinate resources in the subframe level. For example, the indicated subframes could be protected (U) subframes, enabling the UE to measure without interference or at least with reduced interference.

In another aspect, the eNodeB signals CRS symbols of a subframe to be used (or not used) for RLM and RSRP measurement. In one example, these CRS symbols may be used for a relay where the first symbol of a subframe experiences higher interference due to timing offset between the backhaul and access links.

According to another aspect, the eNodeB signals resource blocks (RBs) of CRS tones to be used for RLM and RSRP measurement to a UE. These resource blocks of CRS tones may be used when the eNodeBs coordinate resources in frequency division multiplexing (FDM) partitioning. Additionally, the eNodeB may select CRS tones and/or CRS symbols to avoid interference on the PBCH region. The signaling of which CRS symbols/tones to use may occur in higher layers.

The UE may perform radio link monitoring (RLM) and/or a measurement of the reference signal received power (RSRP) using the subset of CRS tones and/or CRS symbols. The reference signal received power (RSRP) is the linear average over the power contributions (in [W]) of the resource elements that carry cell-specific reference signals within the considered measurement frequency bandwidth.

During radio link monitoring, the physical layer may indicate an out-of-sync/in-sync status to higher layers. The UE is out-of-sync when the radio quality is worse than a threshold value, Qout. The UE is in-sync when the radio link quality is better than a threshold value, Qin. The Qout value is the level at which the downlink radio link cannot be reliably received. The Qin value is the level at which the downlink radio link quality can be significantly more reliably received than at Qout. In one example, the Qout value corresponds to 10% block error rate (BLER) of a hypothetical PDCCH (physical downlink control channel) transmission taking into account the PCFICH (physical control format indicator channel) errors. The Qin value corresponds to 2% BLER of another hypothetical PDCCH transmission taking into account the PCFICH errors. The hypothetical PDCCHs for Qout and Qin evaluation are explicitly defined in the specification (3GPP TS 36.133) in terms of downlink control information (DCI) format, aggregation level, resource element (RE) energy ratio, etc. A layer 3 filter may be applied to the in-sync and out-of-sync indications and the start or stop T310 timer to declare radio link failure (RLF).

Typically, the UE measures CRS tone quality, and using parameters defined for the hypothetical PDCCHs, the UE predicts BLER of the hypothetical PDCCH transmissions based on the measured CRS tone quality.

Another aspect discloses communications in an LTE-A network that do not solely depend on CRSs for radio link monitoring (RLM). In particular, actual PDCCH (physical downlink control channel) block error rate may be monitored for RLM. In one example, a UE is guaranteed to receive certain physical downlink control channels (PDCCHs). For example, system information blocks (SIBs), such as SIB1, SIBx, and paging messages, etc., are received, even when there is no data traffic. The UE can then infer the BLER for Qout and Qin evaluation by collecting decoding statistics of the received PDCCH.

In one example, the UE determines whether the DCI format, aggregation level, and RE (resource element) energy ratio of the decoded PDCCH match those of the hypothetical PDCCH defined for Qout evaluation. If they match, the UE considers the PDCCH to have been successfully decoded for Qout evaluation purposes. If the DCI format, aggregation level, and RE energy ratio of the received PDCCH match those of a hypothetical PDCCH defined for Qin evaluation, the UE considers that the PDCCH to have been successfully decoded for Qin evaluation purpose.

If no PDCCH is decoded at a subframe where a PDCCH transmission is expected, the UE considers that the PDCCH to have not been decoded for Qout and Qin evaluation purposes. The UE then determines the BLER for Qout and Qin by counting the number of successful and unsuccessful decoding attempts and computes the proportion of instances of successful decoding, each for Qout and Qin.

The UE may estimate the radio link quality from the determined BLER. If any of the DCI format, aggregation level, or RE energy ratio of the decoded PDCCH do not match that of the hypothetical PDCCH defined for the Qout or Qin evaluation, the UE compares the DCI format, aggregation level, and the RE energy of the decoded PDCCH with those of Qout or Qin in order to determine whether the PDCCH would still haven been successfully decoded if it had used the DCI format, aggregation level, and the RE energy of the hypothetical PDCCH for Qout or Qin. If it would still have been decoded, the UE considers the PDCCH to have been successfully decoded for Qout or Qin evaluation purpose. If not, the UE considers the PDCCH to have not been decoded for Qout or Qin evaluation purpose.

For example, the UE may have decoded a PDCCH with the DCI format 1C. Because the DCI format 1A is used for Qout evaluation, and the format 1A is more difficult to decode than format 1C, the UE may not have successfully decoded the PDCCH if it were in the DCI format 1A. According to one embodiment, the UE can intentionally add noise by the amount that corresponds to the difference in the two DCI formats in terms of the UE's decoding ability, to test if the PDCCH still successfully decodes. If the test passes, the UE considers the PDCCH to have been successfully decoded for Qout evaluation purpose. If not, the UE considers the PDCCH to have not been decoded for Qout evaluation purpose. For another example, the UE may have decoded a PDCCH with DCI format 1A. Because DCI format 1C is used for Qin evaluation, and the format 1C is easier to decode than format 1A, the UE may safely assume that it would still have successfully decoded the PDCCH if it were in DCI format 1C. Therefore, the UE considers the PDCCH to have been successfully decoded for Qin evaluation purpose.

In another example, the UE may have decoded a PDCCH with aggregation level 8. Because a PDCCH with a smaller aggregation level is harder to decode, and aggregation level 4 is used for Qin evaluation, the UE may add noise to compensate for the difference in the aggregation level, test whether the PDCCH still decodes successfully, and count the pass/fail result toward Qin evaluation. In yet another example, the UE may decode with a larger RE energy ratio than the one specified for Qout or Qin evaluation. Then, the UE may add noise to compensate for the difference in the two RE energy ratios and test whether the UE can still decode the PDCCH. According to one aspect, the RE energy ratio is estimated by measuring the energy on the received PDCCH REs and comparing it against the energy on received CRS REs.

In another example, the UE may decode a PDCCH with a DCI format, aggregation level, and RE energy ratio that are different from those specified for Qout or Qin evaluation. The UE compares the two DCI formats, aggregation levels, and RE energy ratios, to determine which PDCCH is harder to decode. If the UE determines the hypothetical PDCCH is harder to decode, the UE adds noise that corresponds to the difference in its decoding ability of the two PDCCHs, determines whether the UE can still decode the received PDCCH, and counts the pass/fail result toward Qout or Qin evaluation. On the other hand, if the UE determines the hypothetical PDCCH is easier to decode, the UE considers the PDCCH to have been successfully decoded for the Qout or Qin evaluation.

The UE then determines the BLER for Qout and Qin by counting the number of successful and unsuccessful decoding instances and computes the proportion of instances of successful decoding, for each Qout and Qin. The UE then estimates the radio link quality from the determined BLER. Radio link failure can then be declared based on the estimated radio link quality.

The functional blocks and modules in FIGS. 4 and 6A-B may comprise processors, electronics devices, hardware devices, electronics components, logical circuits, memories, software codes, firmware codes, etc., or any combination thereof.

FIG. 6A illustrates a method 601 for. In block 610, signals indicating a subset of CRS resources in for RLM (radio link monitoring) and/or RSRP (reference signal received power) measuring are received from an eNodeB. RLM and/or RSRP measuring are performed on the subset in block 612.

FIG. 6B illustrates a method 602 for. In block 620 PDCCH (physical downlink control information) information is received in subframes of a LTE-A network. A block error rate (BLER) is determined for the received PDCCH in block 622. In block 624, a radio link quality is estimated from the determined BLER for radio link monitoring.

In one configuration, the UE 120 is configured for wireless communication including means for receiving. In one aspect, the receiving means may be the receive processor 458, MIMO detector 456, demodulators 454a-454t, controller/processor 480 and antenna 452a-452t configured to perform the functions recited by the receiving means. The UE 120 is also configured to include a means for performing. In one aspect, the performing means may be the controller/processor 480 and memory 482 configured to perform the functions recited by the performing means. In another aspect, the aforementioned means may be a module or any apparatus configured to perform the functions recited by the aforementioned means.

In another configuration, the UE 120 is configured to include a means for receiving. In one aspect, the receiving means may be the receive processor 458, MIMO detector 456, demodulators 454a-454t, controller/processor 480 and antenna 452a-452t configured to perform the functions recited by the receiving means. The UE 120 110 is also configured to include a means for determining. In one aspect, the determining means may be the controller/processor 480 and memory 482 configured to perform the functions recited by the determining means. The UE 120 110 is also configured to include a means for estimating. In one aspect, the estimating means may be the controller/processor 480 and memory 482 configured to perform the functions recited by the estimating means. In another aspect, the aforementioned means may be a module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for communicating in an advanced long term evolution (LTE-A) network using common reference signal (CRS) resources associated with different interference levels due to resource partitioning, comprising:
   receiving signals from an eNodeB indicating a subset of CRS resources for at least one of radio link monitoring (RLM), reference signal received power (RSRP) measuring, or a combination thereof, the indicated subset of CRS resources comprising CRS resources having protected subframes during which interfering eNodeBs are prohibited from transmitting data; and
   performing at least one of RLM, RSRP measuring, or a combination thereof based on the indicated subset of CRS resources.

2. The method of claim 1, in which the CRS resources comprise one of CRS tones, CRS resource blocks, and CRS symbols.

3. An apparatus for wireless communication, comprising:
   means for receiving signals from an eNodeB indicating a subset of CRS resources for at least one of radio link monitoring (RLM), reference signal received power (RSRP) measuring, or a combination thereof, the indicated subset of CRS resources comprising CRS resources having protected subframes during which interfering eNodeBs are prohibited from transmitting data; and
   means for performing at least one of RLM, RSRP measuring, or a combination thereof based on the indicated subset of CRS resources.

4. The apparatus of claim 3, in which the CRS resources comprise one of CRS tones, CRS resource blocks, and CRS symbols.

5. A computer program product for wireless communication in a wireless network, comprising:
   a non-transitory computer-readable medium having program code recorded thereon, the program code comprising:
      program code to receive signals from an eNodeB indicating a subset of CRS resources for at least one of radio link monitoring (RLM), reference signal received power (RSRP) measuring, or a combination thereof, the indicated subset of CRS resources comprising CRS resources having protected subframes during which interfering eNodeBs are prohibited from transmitting data; and
      program code to perform at least one of RLM, RSRP measuring, or a combination thereof based on the indicated subset of CRS resources.

6. The computer program product of claim 5, in which the CRS resources comprise one of CRS tones, CRS resource blocks, and CRS symbols.

7. An apparatus for wireless communication, comprising:
a memory; and
at least one processor coupled to the memory, the at least one processor being configured:
to receive signals from an eNodeB indicating a subset of CRS resources for at least one of radio link monitoring (RLM), reference signal received power (RSRP) measuring, or a combination thereof, the indicated subset of CRS resources comprising CRS resources having protected subframes during which interfering eNodeBs are prohibited from transmitting data; and
to perform at least one of RLM, RSRP measuring, or a combination thereof based on the indicated subset of CRS resources.

8. The apparatus of claim 7, in which the CRS resources comprise one of CRS tones, CRS resource blocks, and CRS symbols.

* * * * *